United States Patent [19]

Tomiyama et al.

[11] Patent Number: 5,505,288

[45] Date of Patent: Apr. 9, 1996

[54] DAMPER DISC ASSEMBLY

[75] Inventors: Naoki Tomiyama, Settsu; Hiroshi Uehara, Hirakata, both of Japan

[73] Assignee: Kabushiki Kaisha Daikin Seisakusho, Osaka, Japan

[21] Appl. No.: 312,742

[22] Filed: Sep. 27, 1994

[30] Foreign Application Priority Data

Oct. 7, 1993 [JP] Japan .................................. 5-054533 U
Nov. 10, 1993 [JP] Japan .................................. 5-060450 U

[51] Int. Cl.$^6$ ........................................................ F16D 3/14
[52] U.S. Cl. ........................ 192/213.31; 192/70.17; 464/66; 464/68; 74/574
[58] Field of Search ............................. 192/213.31, 70.17, 192/70.18; 464/64, 66, 68; 74/574

[56] References Cited

U.S. PATENT DOCUMENTS 4,950,204 8/1990 Umeyama et al. ............ 192/213.31 X
5,163,875 11/1992 Takeuchi ..................................... 464/64

Primary Examiner—Andrea L. Pitts
Attorney, Agent, or Firm—Shinjyu Office of Patent Attorneys

[57] ABSTRACT

A damper disc assembly is provided for transmitting a torque between an input rotary member and an output rotary member, including a hub, a flange, a first spring member, a support member, a second spring member and an input member. The hub is coupled with the output rotary member. The flange is disposed on an outer circumference of the hub, the flange having, on its outer circumferential portion, first and second spring member receiving portions each extending in a circumferential direction. The first spring member is disposed within the first spring member receiving portion. The support member is retained so as to be non-rotatable relative to the hub for supporting the first spring member in the circumferential direction. The second spring member is disposed within said second spring member receiving portion, and has a higher rigidity than that of the first spring member. The input member is coupled with the flange through the second spring member and capable of being coupled with the input rotary member.

20 Claims, 19 Drawing Sheets

DAMPER DISC ASSEMBLY

BACKGROUND OF THE INVENTION

The present invention relates to a damper disc assembly used in an automotive clutch disc or the like, and more particularly to a damper disc assembly having a wide displacement angle range.

Typically, a damper disc assembly used in an automotive clutch disc is provided with an output hub having a flange formed integrally on its outer circumference, and a coil spring for circumferentially coupling an input plate and an input flange with each other. Furthermore, a separate hub type damper disc assembly has been proposed in which a flange is separated from the hub and a low rigidity spring member is provided for coupling both members with each other in the circumferential direction. In this type of damper disc assembly, a relative displacement angle between the input plate and the input hub is increased, and two-stage displacement characteristics of low rigidity and high rigidity may be obtained.

In the foregoing conventional separate hub type damper disc assembly, low rigidity spring members are provided in an inner circumferential portion of the flange. For this reason, the size of each low rigidity spring member is limited so that the degrees of freedom for designing is limited.

In general, in the damper disc assembly, in order to reduce undesirable sounds generated at a low cruising speed, it is necessary to suppress the displacement rigidity to a low level and to widen the displacement angle range. Accordingly, the conventional approach has been to provide the assembly with two torsion springs juxtaposed in series in the circumferential direction in a single window of the flange, and interpose a float member between the torsion springs. As a result, a displacement angle between the input plate and the flange is increased, so that the special sounds inherent in the low speed cruising may be reduced. Such a conventional damper disc assembly is disclosed in Japanese Utility Model Application Laid-Open No. Hei 1-141931. In this damper disc assembly, raised cut portions which are in contact with circumferential outer end portions of the torsion springs, are formed in a clutch plate and a retaining plate which belong to the input plate.

Also, there has been provided in a conventional damper disc assembly, a lubrication chamber, filled with lubricant fluid, formed between the clutch plate and the retaining plate for lubrication of contact parts between the two plates and the torsion springs. A drawn portion is formed between the clutch plate and the retaining plate to receive the torsion springs in this damper disc assembly.

In this damper disc assembly, a mechanical strength of the raised cut portions formed in the clutch plate and the retaining plate is lowered since a thickness of the plates is reduced by machining. Accordingly, damage is liable to occur in the raised cut portions.

Also, in the case where the drawn portions are formed in the clutch plate and tile retaining plate, a plurality of deeply drawn portions are required to be formed in the circumferential direction. Accordingly, it is difficult to perform the machining work and additionally, the mechanical strength is lowered.

SUMMARY OF THE INVENTION

An object of the invention is to provide a separate hub type damper disc assembly in which a degree of freedom for designing a low rigidity spring member is enhanced.

Another object of the invention is to provide a damper disc assembly in which a displacement angular range is large and spring members may be supported without reducing a mechanical strength of an input member.

In one aspect of tile present invention a clutch hub is couplable with an output rotary member, such as the input shaft to a manual transmission. A flange is formed on an outer circumference of the hub, having on its outer circumferential portion, first and second spring member receiving portions each extending in a circumferential direction. The first spring member is disposed within the first spring member receiving portion. The support member is retained so as to be non-rotatable relative to the hub for supporting the first spring member in the circumferential direction. The second spring member is disposed within said second spring member receiving portion, and has a higher rigidity than that of the first spring member. The input member is coupled with the flange through the second spring member and is capable of being coupled with the input rotary member.

In this damper disc assembly, when the input rotary member starts to rotate, the torque is transmitted from the input member to the hub through the first spring member, the second spring member and the support member and further output from the hub to the output rotary member. When a displacement vibration is transmitted to the damper disc assembly, if a displacement angle of the displacement vibration is small, expansion and compression of the first spring member are repeated between the hub and the flange. If the displacement angle of the displacement vibration is large, expansion and compression of the second spring member are also repeated between the input rotary member and the flange.

In this case, since the first spring member is arranged in the outer circumferential portion of the flange, the freedom of location of the first spring member may be wide in comparison with the conventional structure. As a result, it is possible to enhance the degree of freedom for designing the first spring member.

According to another aspect of the invention, there is provided a damper disc assembly including a hub, at least two spring members, a spring support member, an input disc-like plate and a contact member. The hub is coupled with an output rotary member, having on its outer circumference, a flange where a window is formed extending in a circumferential direction. At least two spring members are juxtaposed in series in the circumferential direction within the window. The spring support member is disposed so as to be movable in the circumferential direction between the spring members. The input disc-like plate is disposed on the flange side. The contact member is retained to be non-rotatable relative to the input disc-like plate and brought into contact with the circumferential outer end portions of the spring members.

In this damper disc assembly, when the input disc-like plate rotates, the torque is transmitted to the flange through at least two spring members and further transmitted to the output rotary member through the hub. When a displacement vibration is transmitted to the damper disc assembly, the input disc-like plate and the hub are relatively rotated. At this time, a plurality of spring members disposed in the window of the flange repeat compression and expansion movement. If the number of the spring member is two, the angle of rotation of the spring support member is in halve in comparison with the angle through which the input disc-like plate is rotated relative to the flange. As a result, a wider displacement angle range may be obtained, and the displacement vibration may be effectively absorbed.

In the damper disc assembly, since the torque of the input disc-like plate is transmitted to the spring members by the contact member, it is unnecessary to form raised cut portion or deeply drawn portions in the input disc-like plate. For this reason, the mechanical strength of the input disc-like plate is improved and a damage less likely to occur. It is also easy to form a lubricant chamber which is filled with lubricant fluid between two input disc-like plate members.

These and other objects, advantages and features of the present invention will become apparent when reading the following detailed description In conjunction with the accompanying drawings.

DESCRIPTION OF THE PREFERRED EMBODIMENTS

The present invention will now be described with reference to the accompanying drawings.

Figure 1:
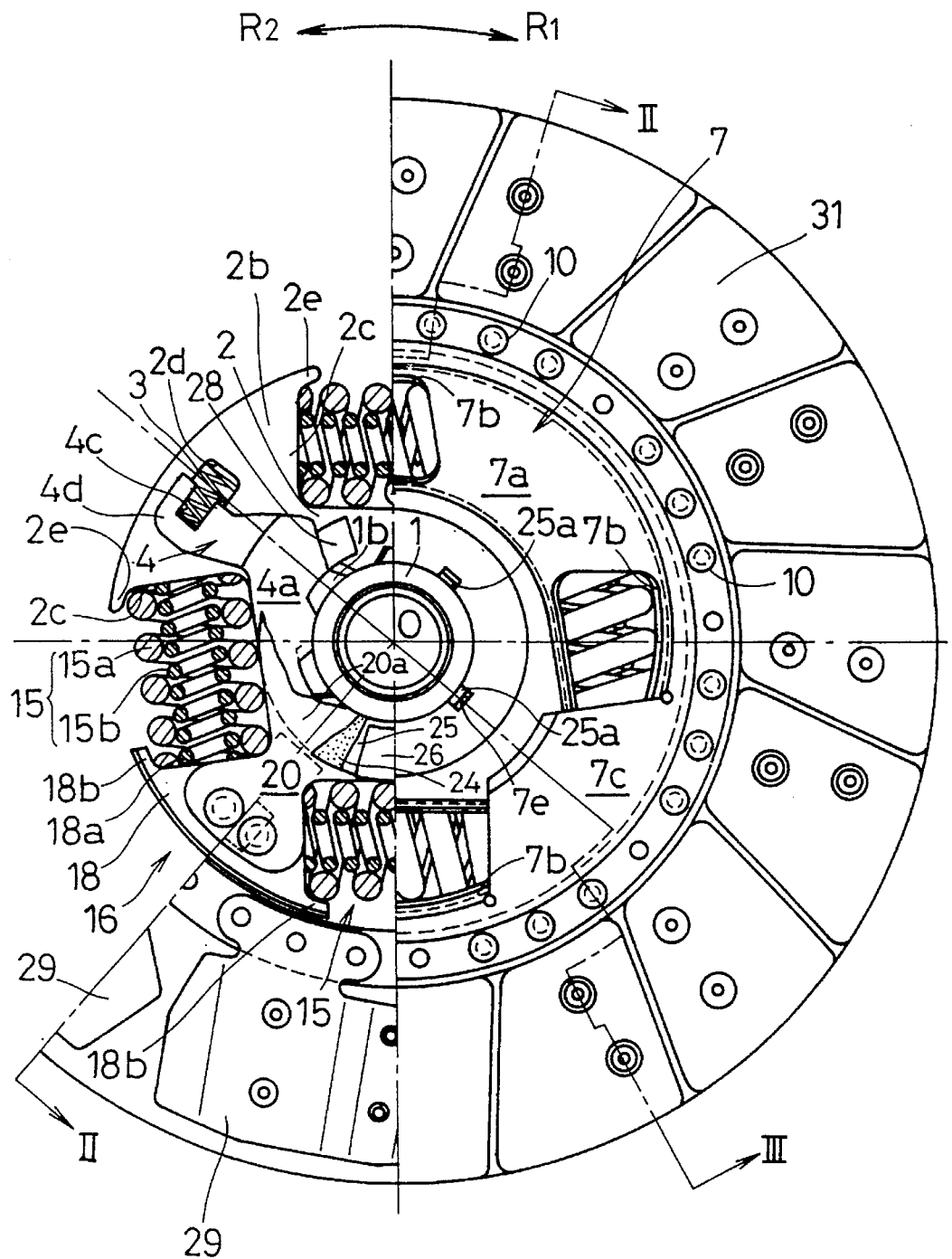
FIG. 1 is a fragmentary plan view showing a damper disc assembly according to a first embodiment of the invention.
Figure 2:
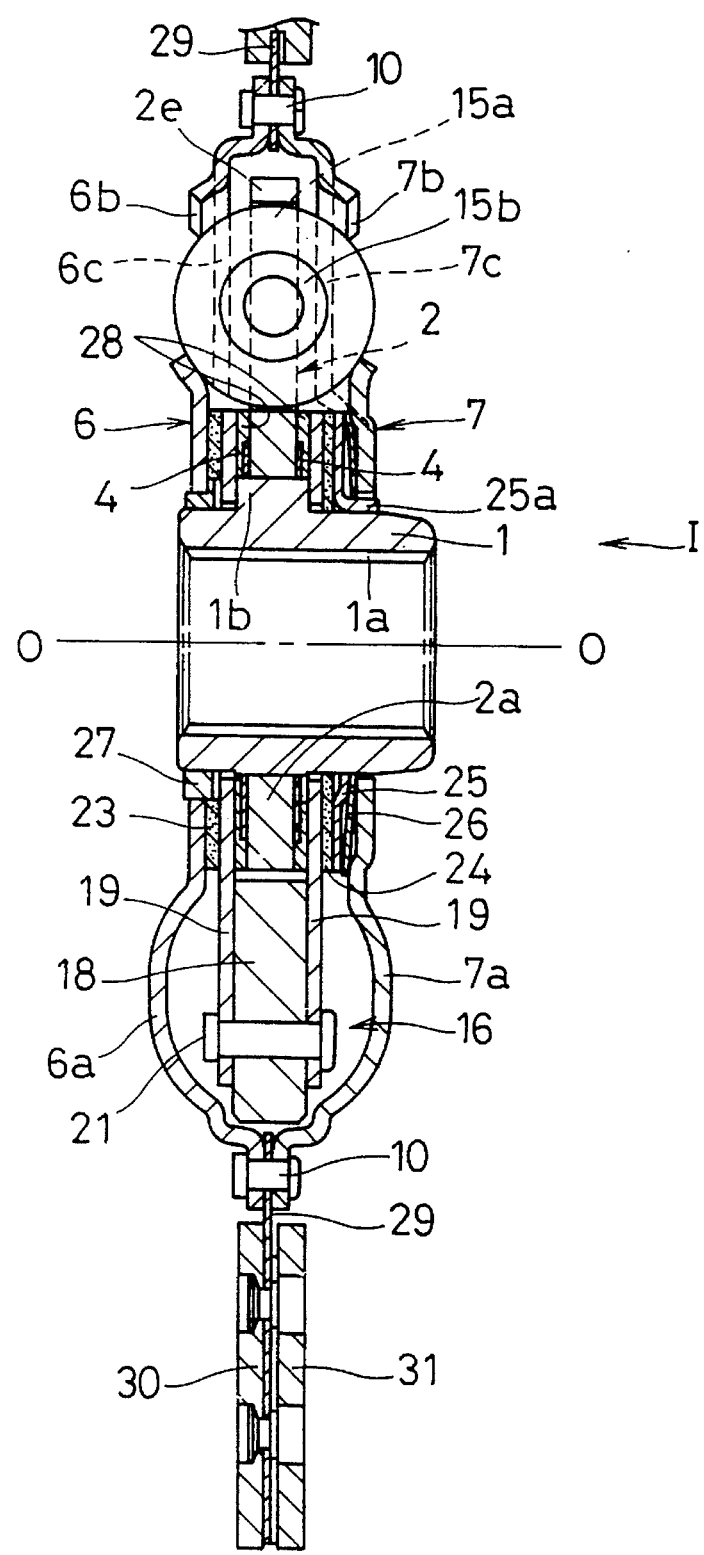
FIG. 2 is a cross-sectional view taken along the line II—II of FIG. 1.
Figure 3:
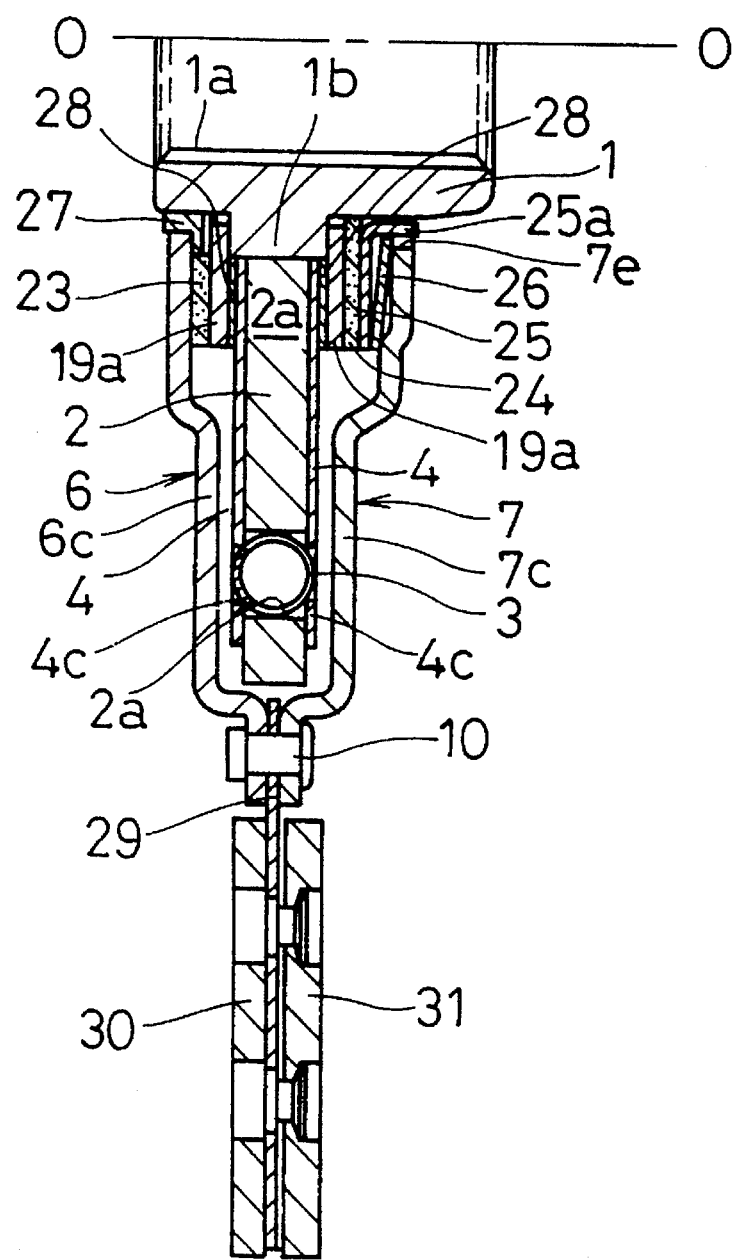
FIG. 3 is a cross-sectional view taken along the line III-O of FIG. 1.

FIGS. 1 to 3 show a damper disc assembly according to a first embodiment of the present invention. R1 indicated by an arrow in FIG. 1 represents a rotational direction of the damper disc assembly, and R2 represents a reverse rotational direction. Also, in FIGS. 2 and 3, a line 0—0 denotes a rotary axis of the damper disc assembly.

A hub 1 having a central aperture or bore is formed with inner splines 1a. The hub 1 is couplable to the shaft of a transmission (not shown) which is an output rotary member. A plurality of outwardly extending spline teeth 1b are formed at equal intervals in the circumferential direction on the hub 1, as is more clearly seen in FIG. 7.

Figure 6:
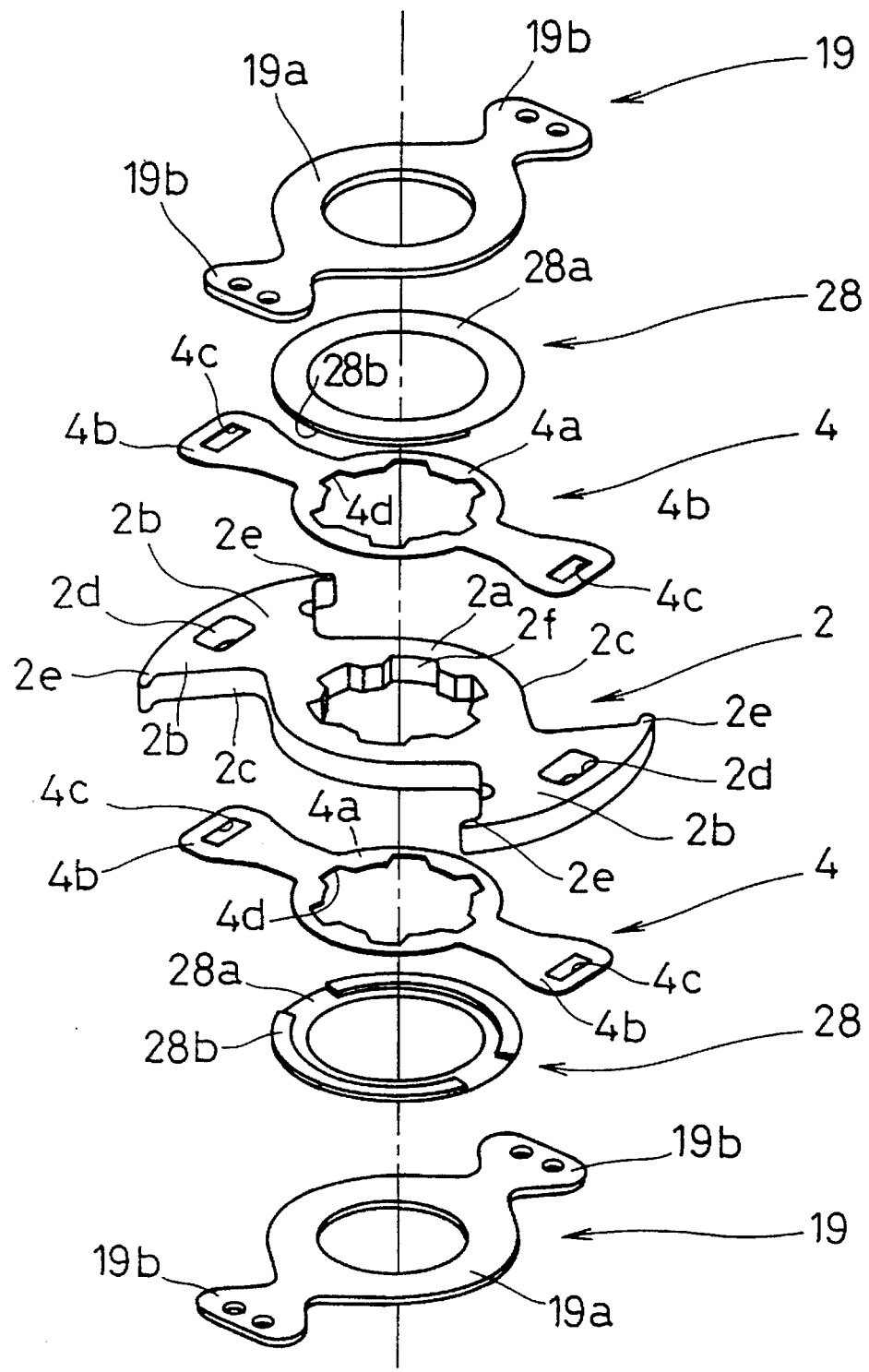
FIG. 6 is an exploded view showing components of the damper disc assembly shown in FIG. 1.
Figure 7:
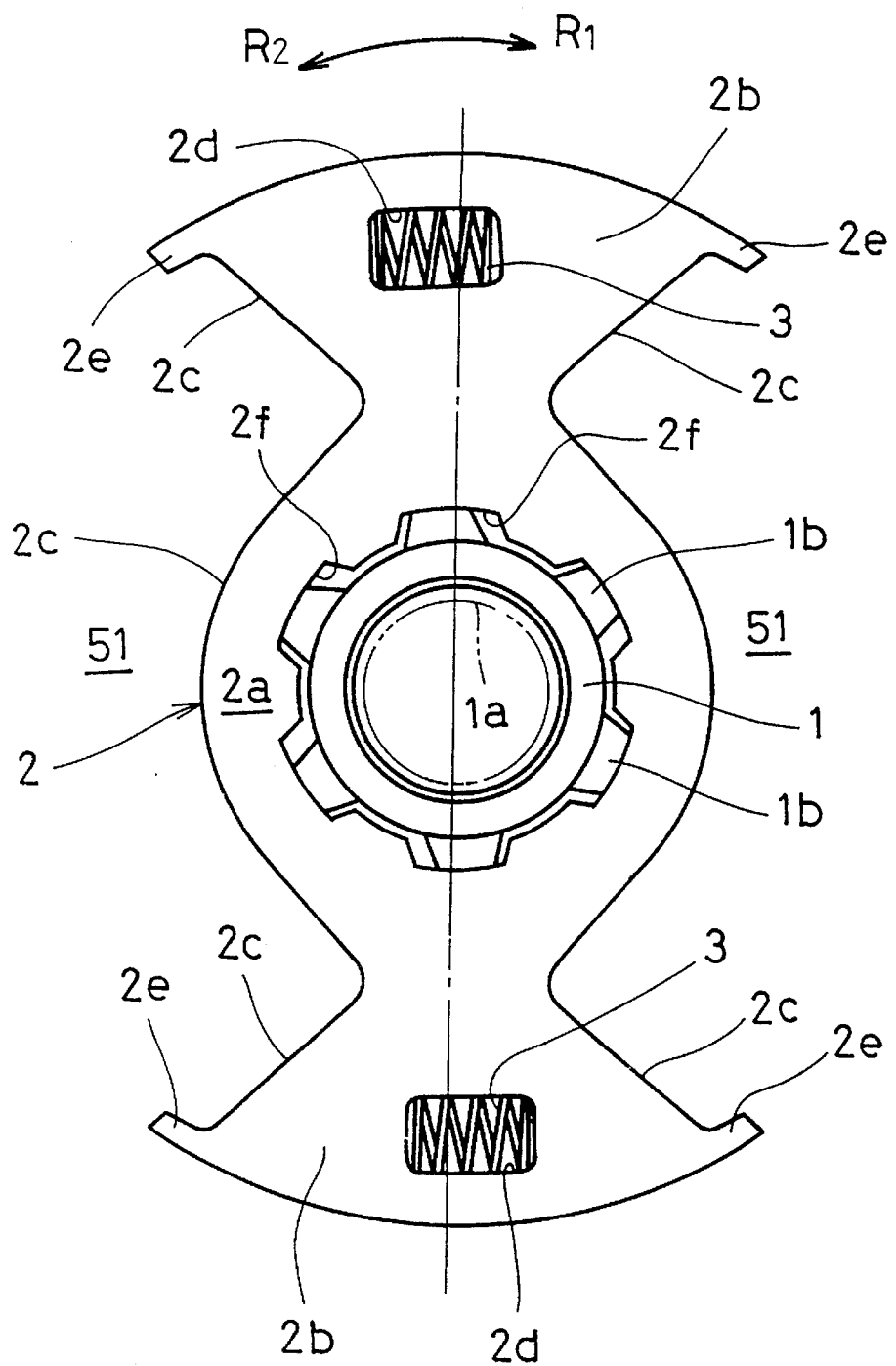
FIG. 7 is a plan view showing a flange depicted in FIGS. 1 and 6.

A flange 2 is arranged on an outer circumference of the spline teeth 1b of the hub 1. As best shown in FIGS. 6 and 7, the flange 2 is a thick plate which is composed of a disc portion 2a and two sector portions 2b provided on an outer circumference of the disc portion 2a. A large second window 51 (second spring member receiving portion) extending in the circumferential direction is formed between end faces 2c of each sector portion 2b in the circumferential direction. Each second window 51 is opened radially outwardly. A spring receiving portion 2e extending in the circumferential direction is formed on an outer circumferential side of each end face 2c. A small first window 2d (first spring member receiving portion) extending in the circumferential direction is formed in each sector portion 2b.

As best shown in FIG. 7, each first window 2d is shifted in the rotational direction R2 from the central position of each sector portion 2b. A center hole which engages with the outer circumference of the hub 1 is formed in the central portion of the disc portion 2a. A plurality of cutaways 2f which are engagable with the spline teeth 1b of the hub 1 are formed in the center hole. A predetermined circumferential gap is maintained between each spline tooth 1b and associated cutaway 2f. With such an arrangement, the hub 1 and the flange 2 are relatively rotatable with respect to one another within a predetermined angular displacement range. Incidentally, in a neutral position, where there is no torsional stress on the hub and hence no rotational displacement as shown in FIGS. 1 and 7, the hub 1 is displaced in the rotational direction R2 relative to the flange 2. More specifically, the gap is formed between each spline tooth 1b of the hub 1 and each associated cutaway 2f of the flange 2 so as to cause a large angular displacement range of about 8× in the rotational direction R1, whereas the gap is formed so as to cause the displacement action in a small angular range of about 2× in the rotational direction R2.

A small spring 3 (first spring member) extending in the circumferential direction and made of low rigidity coil spring is disposed in each first window 2d. Since the small spring 3 is disposed in an outer circumferential portion of the flange 2, a degree of freedom for designing a spring is high in comparison with a conventional structure in which the spring is disposed in the inner circumferential portion of the flange 2. For example, it is possible to increase a circumferential length of the spring and a diameter thereof in comparison with the conventional arrangement.

Figure 8:
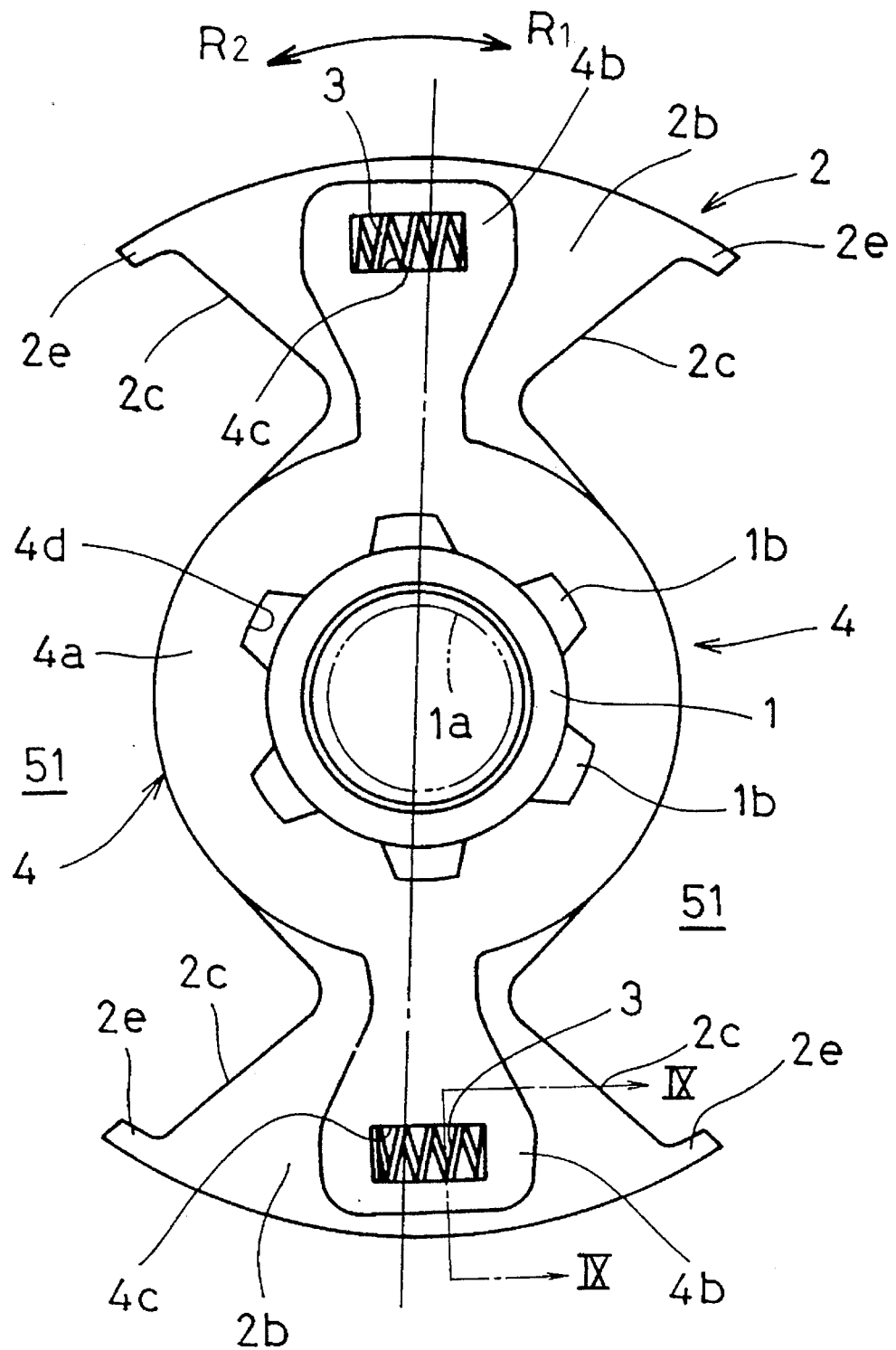
FIG. 8 is a plan view showing a sub-plate depicted in FIGS. 1 and 6.
Figure 9:
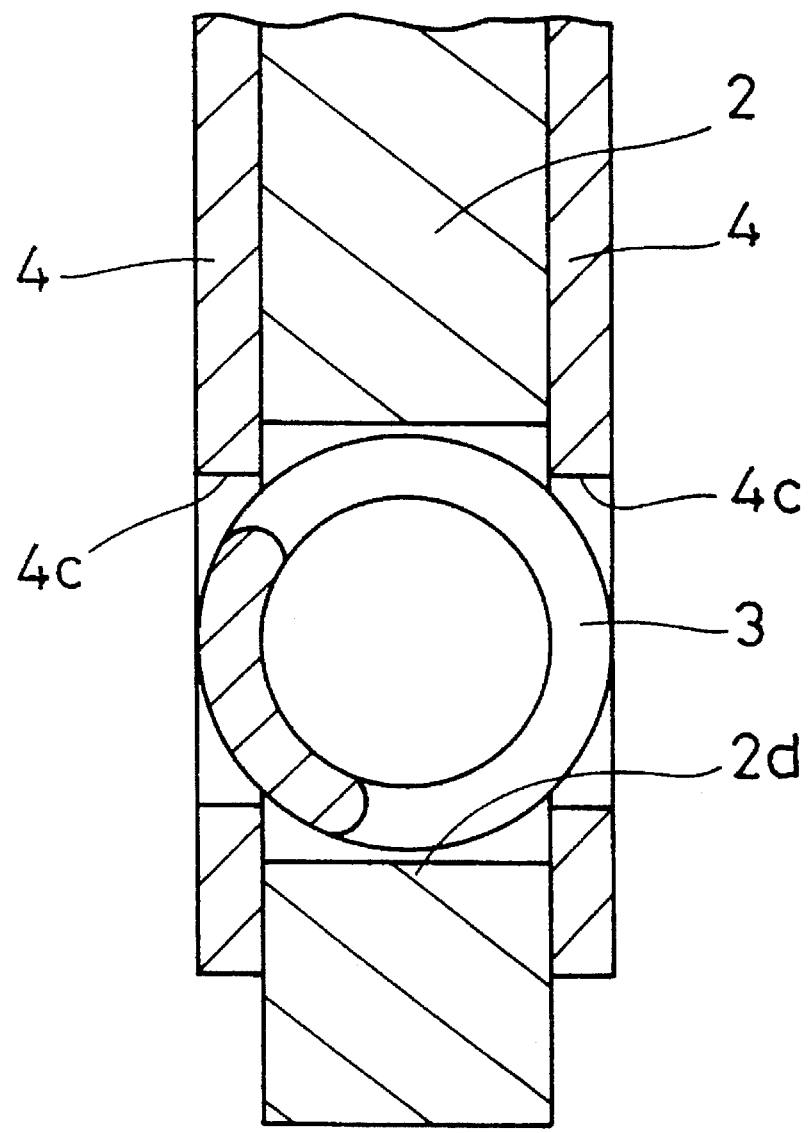
FIG. 9 is a cross-sectional view taken along the line IX—IX of FIG. 8.

A pair of thin sub-plates 4 (support members) are arranged in contact with opposite surfaces of the flange 2. As best shown in FIGS. 6 and 8, each sub-plate 4 is composed mainly of a disc portion 4a, and two spring retainer portions 4b extending radially outwardly from the disc portion 4a. A window 4c is formed in each spring retainer portion 4b. The windows 4c support both circumferential ends of each small spring 3 and also support the small spring 3 in the axial direction in order to prevent the small spring 3 from falling away from the window 2d of the flange 2 as shown in FIG. 9. A central portion of each disc portion 4a has a central hole that is engaged with the circumference of the hub 1. Cutaways 4d that engage the spline teeth 1b of the hub 1 are formed in the central hole. The cutaways 4d generally conform in size and shape to the spline teeth 1b, and therefore the sub-plates 4 are not rotatable relative to the hub 1. As a result, tile sub-plates 4 couple the flange 2 and the hub 1 through the small springs 3.

Figure 4:
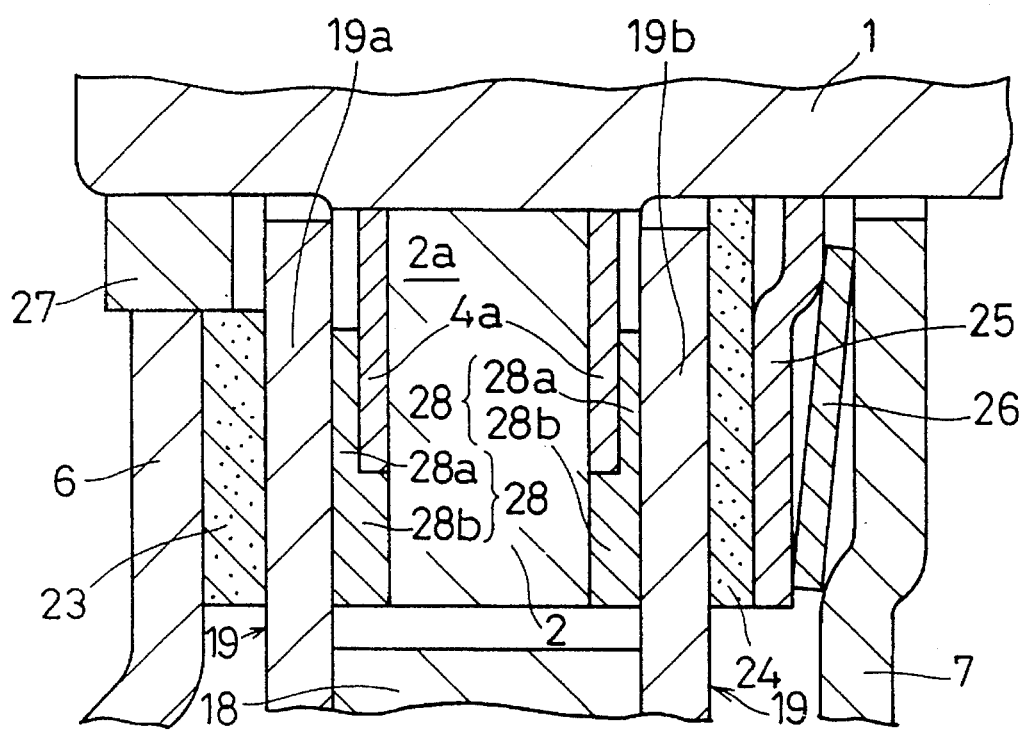
FIG. 4 is an enlarged view of a portion of FIG. 2.
Figure 5:
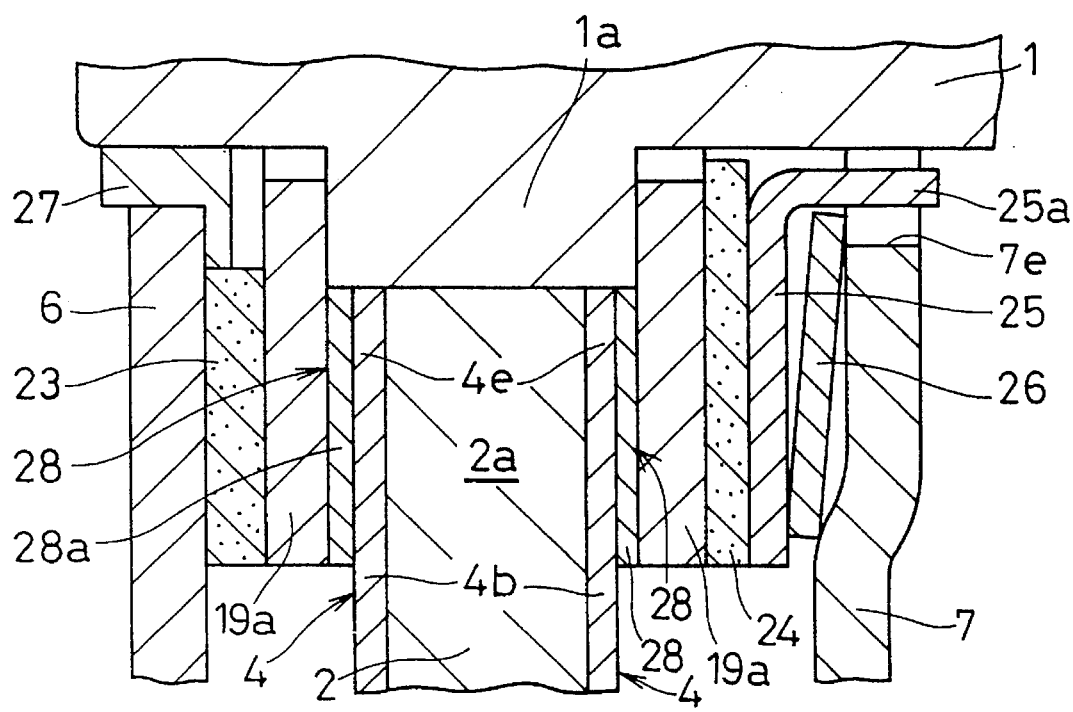
FIG. 5 is an enlarged view of a portion of FIG. 3.

As is best shown in FIGS. 4, 5 and 6, a frictional plate 28 is disposed on an axial outer side of each sub-plate 4. Each of the frictional plates 28 is provided with a disc portion 28a and a pair of semi-circular contact portions 28b formed on an outer circumferential portion of the disc portion 28a. The disc portion 4a of each sub-plate 4 is fitted into the contact portions 28b. Each spring retainer portion 4b of each sub-plate 4 extends radially outwardly from between end portions of two contact portions 28b. With such an arrangement, the sub-plates 4 and the frictional plates 28 are engaged with each other so as to rotate together. Incidentally, these plates 4 and 28 may be adhered together. The foregoing structure causes the contact portions 28b of the frictional plates 28 to come into contact with the disc portion 2a of the flange 2 as shown in detail in FIGS. 4 and 5.

Clutch plate 6 and the retaining plate 7 which are the input members are arranged on opposite sides of the flange 2 and are disc-like plates each rotatably engaging the hub 1 from opposite outward sides. Both plates 6 and 7 have central holes that engage the circumference of the hub 1. Four cutaways 7e (see FIG. 1) are formed in the central hole of the retaining plate 7. An inner circumferential edge of the clutch plate 6 is supported by the hub 1 through a bushing 27. Outer circumferential portions of the two plates 6 and 7 are securely fixed to each other by a number of rivets 10. An inner circumferential portion of a cushioning plate 29 is securely fixed to the outer circumferential portions of the two plates 6 and 7 by the rivets 10. Facings 30 and 31 are fixed to the opposite surfaces of the cushioning plate 29. When the facings 30 and 31 are pushed against, for example, a flywheel (not shown) on an engine side, a torque is input into the damper disc assembly.

As is shown in FIGS. 1, 2 and 3, a pair of drawn portions 7a extending in the circumferential direction are formed in an intermediate portion in a radial direction of the retaining plate 7. Each of the drawn portions 7a is formed to protrude axially outwardly. A flat portion 7c is formed between the drawn portions 7a. Windows (cutouts) 7b are formed at both ends of each drawn portion 7a. Also, the clutch plate 6 has drawn portions 6a, windows 6b and flat portions 6c at positions corresponding to these components of the retaining plate 7.

Two coil springs 15 are arranged within the respective second windows 51 of the flange 2, that is, at positions corresponding to the drawn portions 6a and 7a of the clutch plate 6 and the retaining plate 7, respectively. Namely, four coil springs 15 in total are arranged. As is apparent from FIG. 1, each coil spring 15 is composed of a large spring 15a and a small coil spring 15b disposed within the large coil spring 15a. Circumferential outer end faces of each large coil spring 15a and small coil spring 15b are in contact with end faces 2c of the flange 2. A spring support structure 16 (to be described later) is arranged between the pair of coil springs 15 within each second window 51, and the circumferential inner end faces of each coil spring 15 is in contact with the spring support structure 16. The planar portions 7c and 6c of the retaining plate 7 and the clutch plate 6 are in contact with the circumferential outer end faces of each coil spring 15. Thus, the flange 2 and the clutch plate 6 and the retaining plate 7 are elastically coupled in the circumferential direction through coil springs 15 therebetween. It should be noted that each drawn portion 7a formed in the clutch plate 6 and retaining plate 7 restricts the movement of each coil spring 15 axially outwardly.

The spring support structure 16 will be explained with reference to FIG. 10. The spring support structure 16 is composed mainly of a pair of float members 18, a pair of support plates 19 and a plurality of rivets 21.

Figure 10:
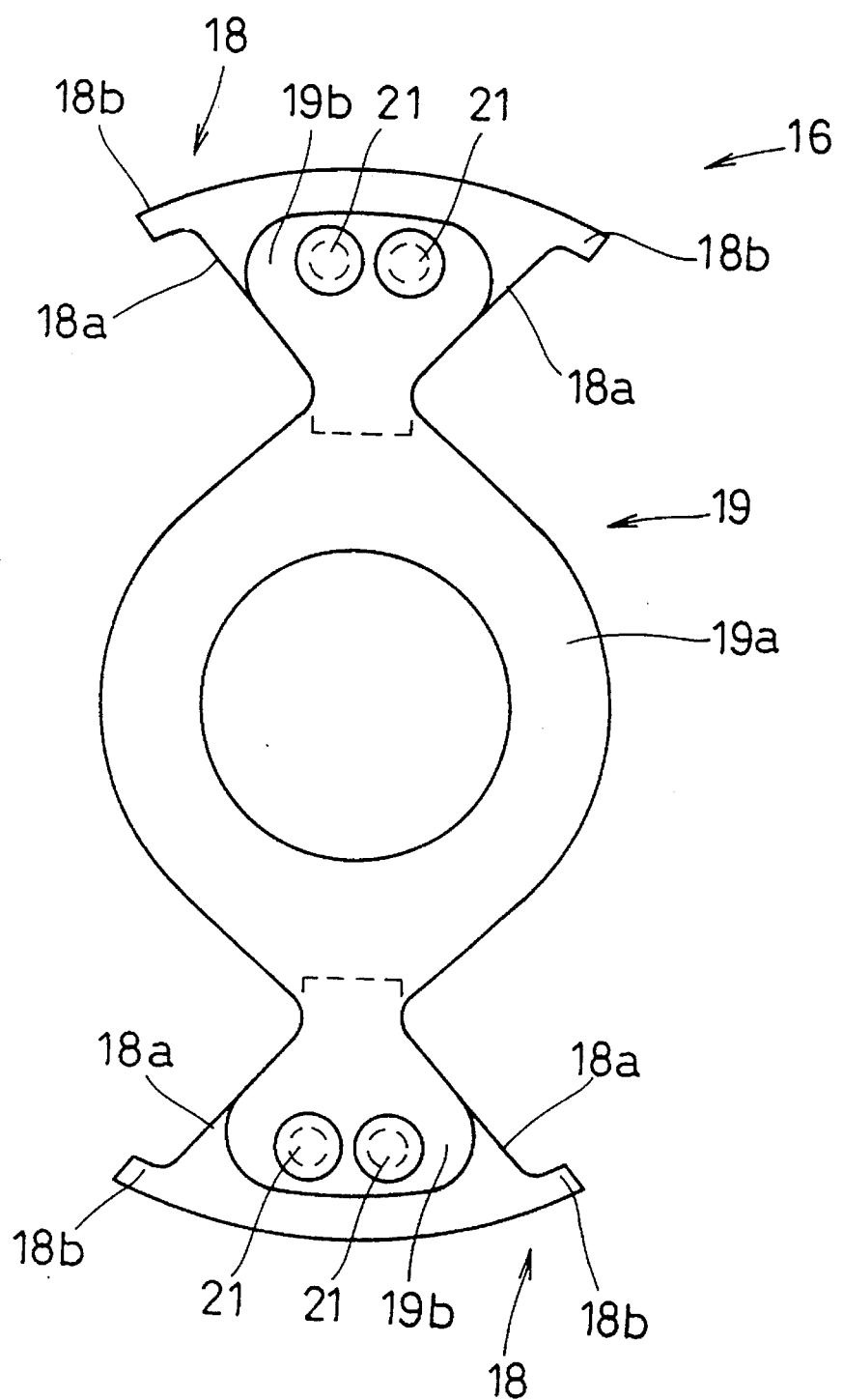
FIG. 10 is a plan view showing a spring support structure depicted in FIGS. 1 and 6.

As is apparent from FIG. 10, each float member 18 is shaped substantially into a sector. Each float member 18 is sandwiched between two coil springs 15 within each second window 51. Both circumferential faces of each float member 18 are contact faces 18a in contact with tile circumferential inner faces of each coil spring 15. The float member 18 has spring retainer portions 18b extending in the circumferential direction from both ends of the sector shape on the radially outward side. The spring retainer portion 18b restricts the radially outward movement of the coil spring 15 together with the spring retainer portion 2e formed in each end face 2c of the flange 2. Each support plate 19 is arranged on the sub-plate 4 on the axially outward side and is provided with a center hole that rotatably engage with the circumference of the hub 1. Each support plate 19 is composed of a disc portion 19a having the center hole and retainer portions 19b extending radially outwardly. Each float member 18 is fixed and sandwiched between the retainer portions 19b of the support plates 19 by two rivets 21. Thus, since each float member 18 is not movable radially outwardly, it is not necessary to provide any window in the flange 2 for restricting the movement of the float member 18. Also, one surface of the disc portion 19a of each support plate 19 is in contact with the disc portion 28a of the friction plate 28 as shown in FIGS. 4 and 5.

As shown in FIGS. 4 and 5, a friction washer 23 is disposed between the inner circumferential portion of the clutch plate 6 and the disc portion 19a of one of the support plates 19.

Between the disc portion 19a of the other support plate 19 and the inner circumferential portion of the retaining plate 7, there are provided a friction washer 24, a retaining plate 25, and a cone spring 26 in this order from the disc portion 19a. The retaining plate 25 has, in its inner circumferential edge, four retainer portion 25a extending toward the retaining plate 7. Each retaining portion 25a passes through the inner circumferential side of the cone spring 26 and penetrates into a cutaway 7e formed in the inner circumferential edge of the retaining plate 7. Thus, the plate 25 is engaged with the retaining plate 7 so as to be movable in the axial direction but not rotatable relative to the retaining plate 7. The inner circumferential end of the cone spring 26 is supported to the retaining plate 7 and the outer circumferential end pushes the plate 25 toward the friction washer 24.

The operation of the damper disc assembly will now be described.

When the facings 30 an 31 are pressed against the flywheel of an engine (not shown) by, for instance, a clutch pressure plate (also not shown), the torque from the engine flywheel is input into the clutch plate 6 and the retaining plate 7. The torque is transmitted to the flange 2 through the coil springs 15. The torque is further transmitted to the hub 1 through small springs 3 and the sub-plates 4 and furthermore transmitted to the shaft (not shown) on the output side.

When the displacement vibration is transmitted from the engine side flywheel (not shown) to the damper disc assembly, the clutch plate 6 and the retaining plate 7 which are the input side members repeatedly take rotations in the circumferential direction relative to the hub 1. At this time, the coil springs 15 and the small springs 3 repeatedly extend and compress to absorb the displacement vibration.

Figure 11:
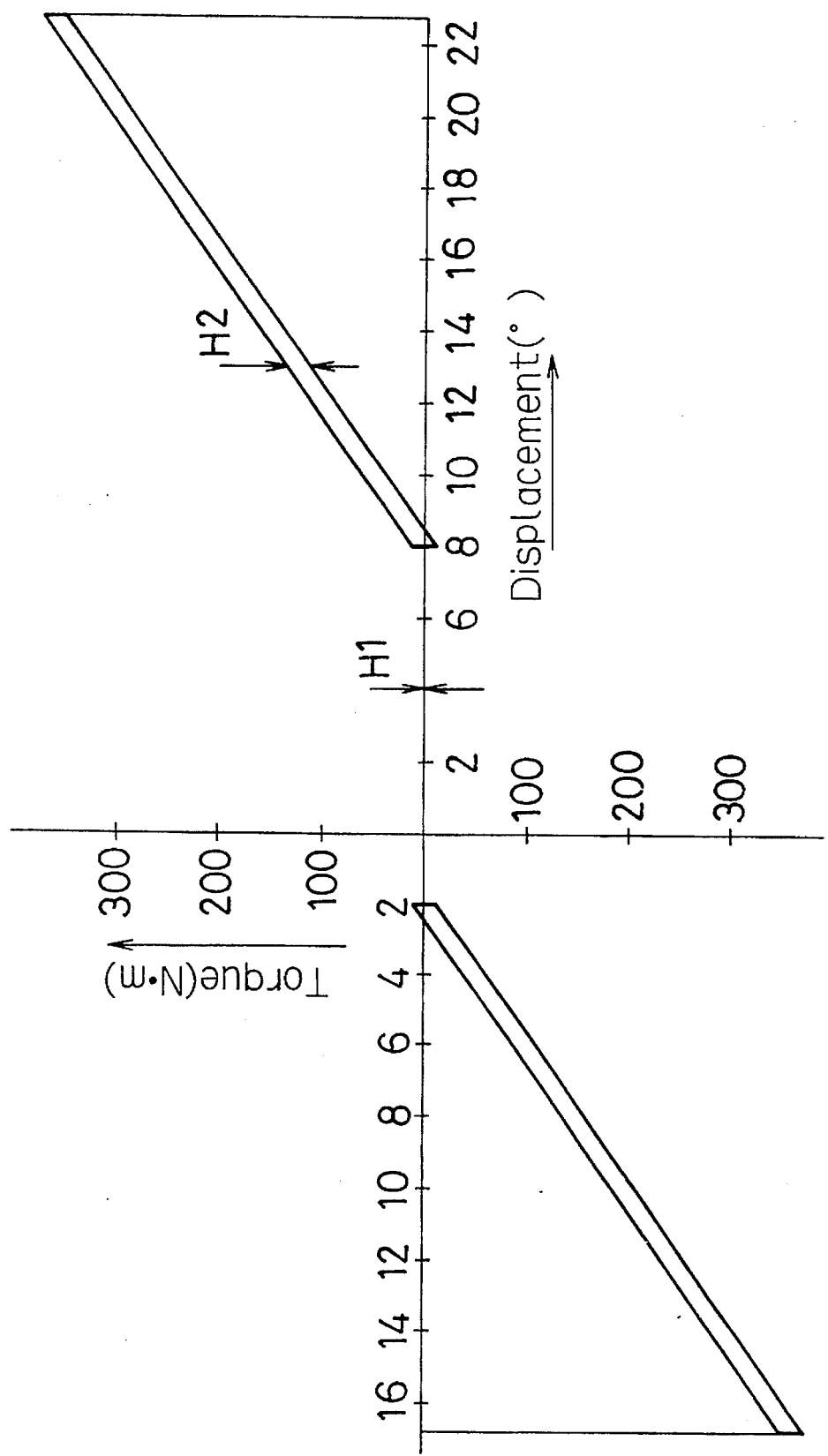
FIG. 11 is a graph showing displacement characteristics of the damper disc assembly depicted in FIGS. 1 and 6.

The relative rotational motion between the hub 1 and the clutch plate 6 and retaining plate 7 which are the input members of the damper disc assembly will now be described with reference to displacement characteristic curves shown in FIG. 11. Assume that the hub 1 is fixed to the shaft of a transmission (not shown) and there is torque applied to the hub via an engine flywheel (not shown) so that both plates 6 and 7 are displaced relative to the hub 1.

The clutch plate 6 and the retaining plate 7 are displaced in the rotational direction R1 from the neutral position shown in FIG. 1. Then, in the initial stage of the displacement angle, since the rigidity of the small springs 3 is smaller than that of the coil springs 15, the small springs 3 are compressed between the flange 2 and the sub-plates 4. Each leading end face of each cutaway 2f of the flange 2 in the direction R1 is brought into contact with the spline tooth 1b to end the relative rotation of the flange 2 and the hub 1. In FIG. 11, the angle is 8×.

When, for instance, a reciprocating angular motion is generated by the displacement vibration in the range in this first stage, a low rigidity characteristic is obtained by the small springs 3. Also, frictional resistances are generated between the friction plate 28 and the sub-plate 4 retained securely to the hub 1 and the disc portions 19a of both support plates 19 and the inner circumferential portion 2a of the flange 2 disposed on both sides to obtain a low hysteresis torque H1. Here, since both surfaces of the respective friction plates 28 serve to cause the frictional sliding, if the frictional resistance (hysteresis torque) is the same as that of the structure where only one surface of the respective friction plates 28 serves to cause the frictional sliding, it is possible to reduce the surface pressure to half the level in comparison with the one surface type structure. Due to the fact that the surface pressure is reduced, the wear of the frictional plates 28 is suppressed and the hysteresis torque in the first stage becomes stable.

When the displacement operation is occurring, there is the relative rotation between the clutch plate 6 and retaining plate 7 and the flange 2. As the displacement angle increases, engagement plates 12 and 13, which are engaged with both plates 6 and 7, serve to compress the coil springs 15 between them and the end faces 2c of the flange 2. At this time, assuming that the plates 6 and 7 are displaced at, for example, 16× relative to the hub 1 and the flange 2, the spring support structure 16 including the float member 18 is displaced at half the angle, i.e., 8× relative to the hub 1 and the flange 2. When the coil springs 15 are compressed intimately, the displacement operation is completed. In FIG. 11, the angle has just exceeded 22×.

In the region of this second stage, when the reciprocating angular motion is generated by, for example, the vibration, a characteristic of high rigidity and wide displacement angle is obtained by the coil springs 15. Also, in this case, the support plates 19 are always displaced only through half the displacement angle of the clutch plate 6 and retaining plate 7, and the relative rotation is generated between the support plates 19 and the plates 6 and 7. For this reason, the friction washers 23 and 24 slid between the clutch plate 6 and the retaining plate 7 and each of the support plates 19, thus generating the frictional resistance. As a result, a medium hysteresis torque H2 is obtained.

In the case where the clutch plate 6 and the retaining plate 7 are displaced in the rotational direction R2 from the neutral position, the first stage region is up to 2× and the overall region is beyond 16×.

Figure 12:
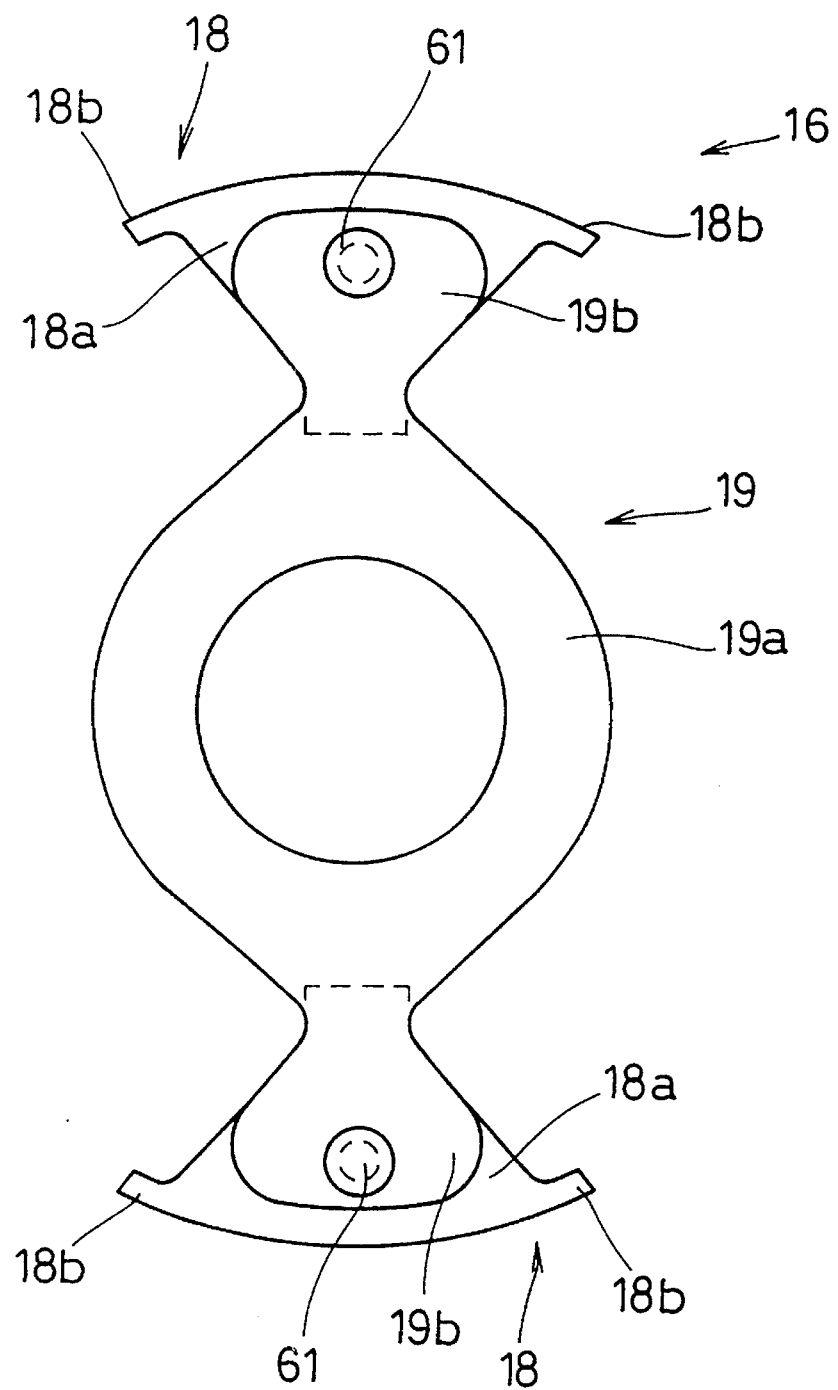
FIG. 12 is a view similar to FIG. 10, showing a modification to tile parts depicted in FIG. 10.

In the foregoing embodiment, each float member is fixed to the support plate 19. It is however possible to rotatably couple the float member 18 to each retainer portion 19b of the support plate 19 by a pin 61 as shown in FIG. 12. In this case, in response to a difference of flexion between the outer circumferential end and the inner circumferential end of each coil spring 15 when the coil spring 15 is compressed, the float member 18 is rotated so that the inner circumferential end is expanded in the circumferential direction and the outer circumferential end is compressed in the circumferential direction. As a result, the coil spring 15 is compressed substantially in parallel so that the amount of flexion may be constant between the outer and inner circumferential ends. For this reason, the bending stress applied to the coil spring 15 is suppressed to improve the durability.

Figure 13:
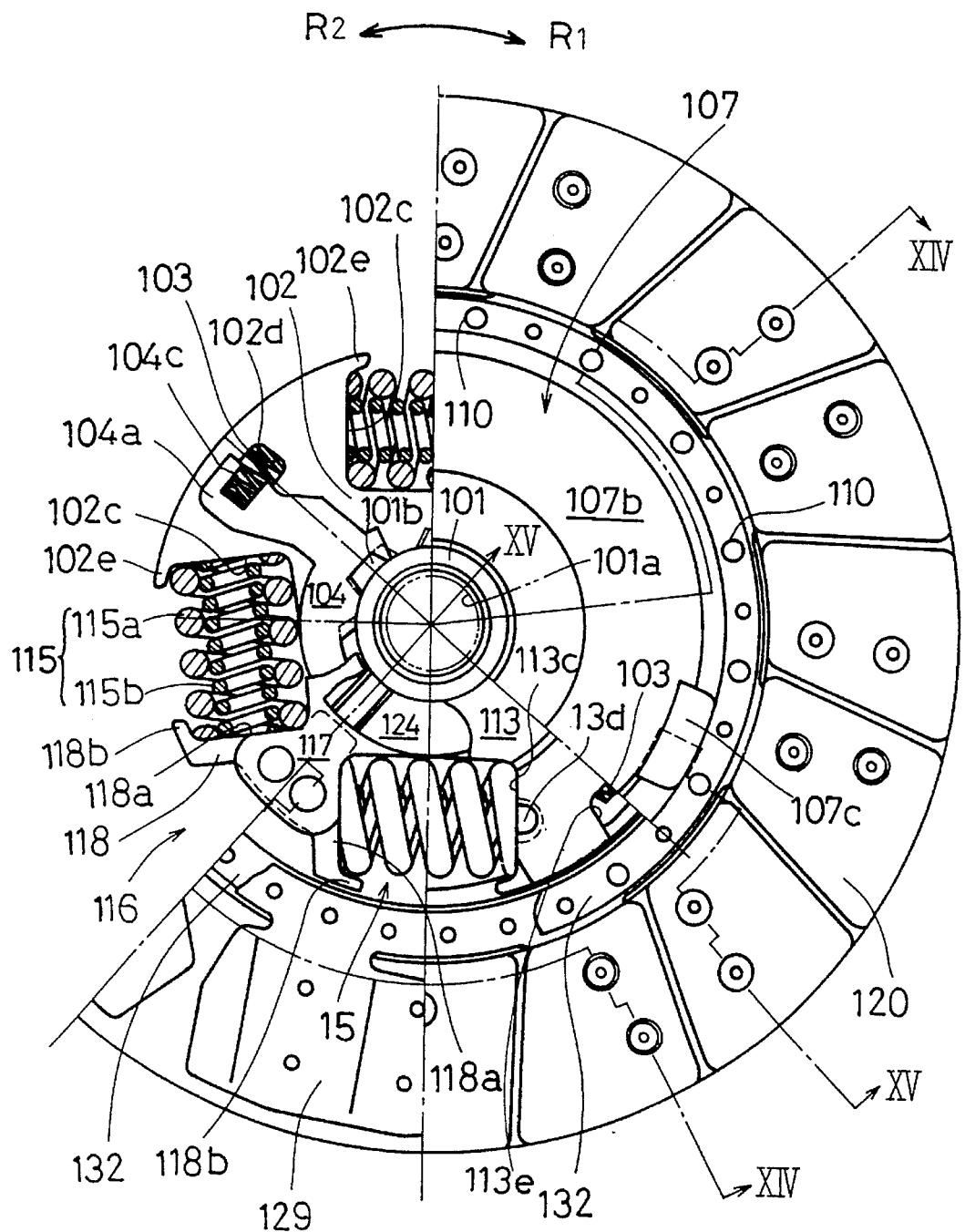
FIG. 13 is a fragmentary plan view showing a damper disc assembly according to a second embodiment of the invention.
Figure 14:
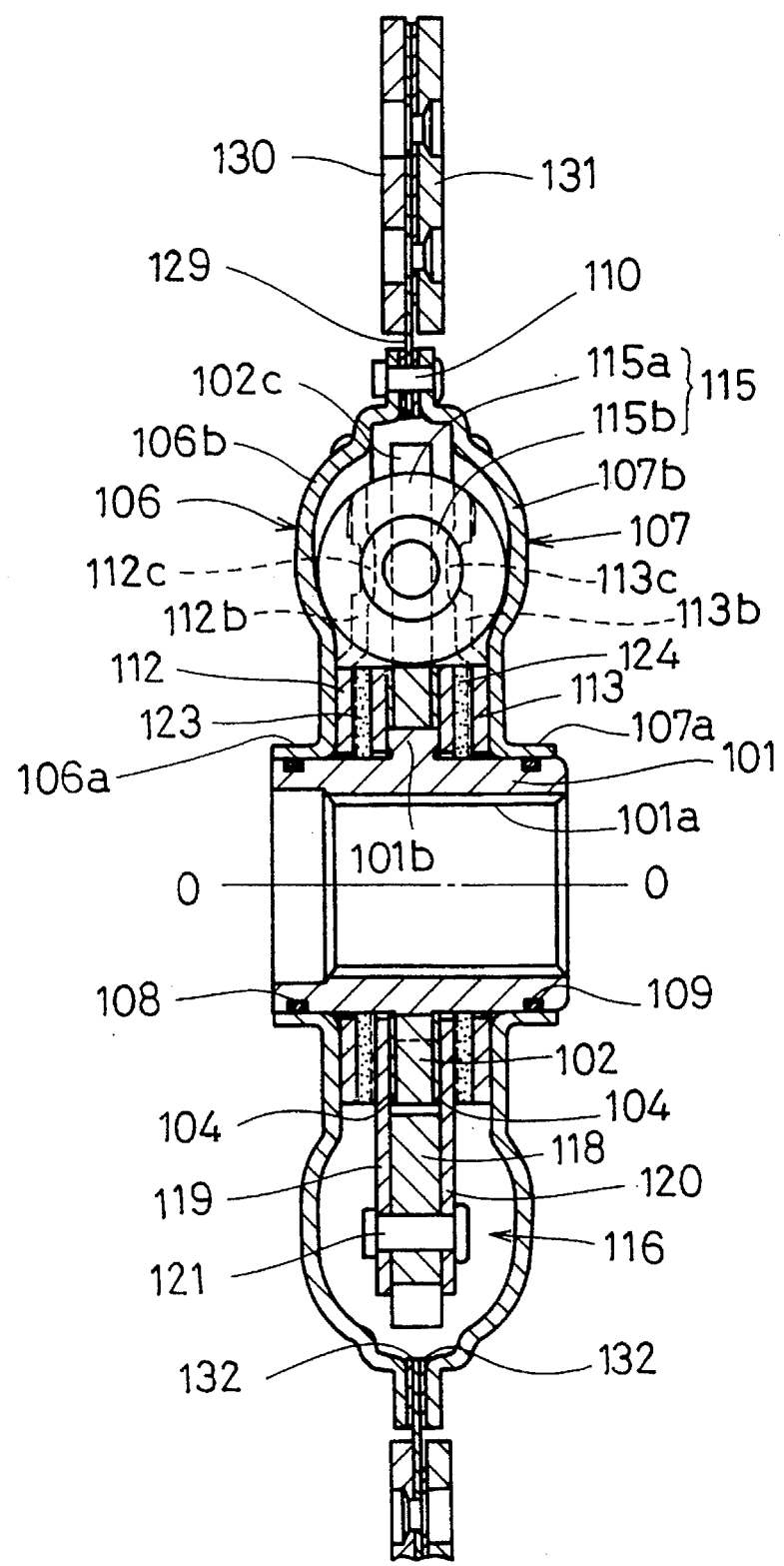
FIG. 14 is a cross-sectional view taken along the line XIV—XIV of FIG. 13.
Figure 15:
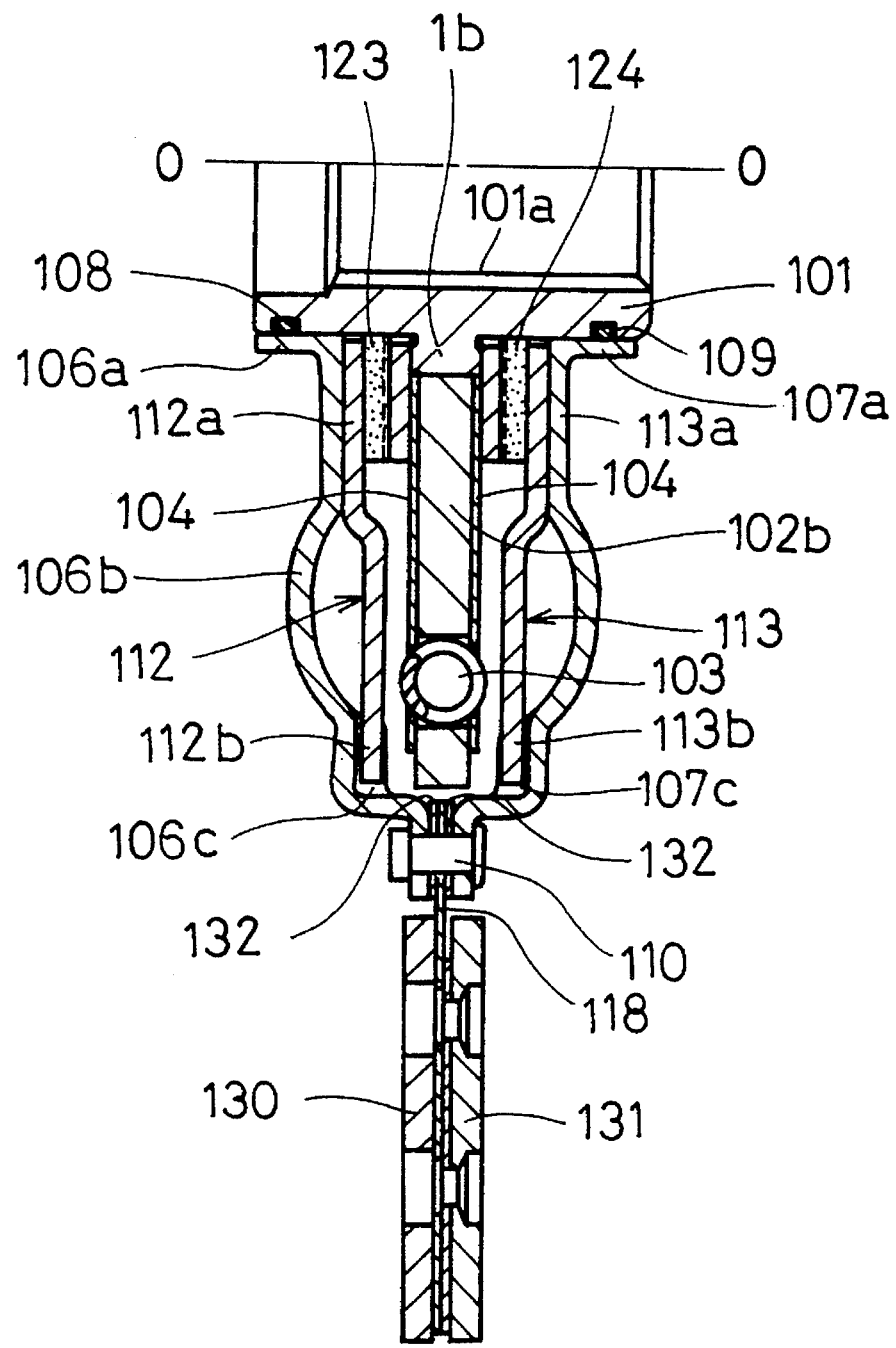
FIG. 15 is a cross-sectional view taken along the line XV—XV of FIG. 13.

FIGS. 13 to 15 show a damper disc assembly according to a second embodiment of the invention. A hub 101, couplable with a shaft of a transmission (not shown) which is an output member, is arranged in a center of this damper disc assembly. The hub 101 has spline holes 101a formed in a central aperture. A plurality of spline teeth 101b extending radial outwardly are formed at equal intervals in the circumferential direction on the outer periphery of the hub 101.

A flange 102 is arranged on an outer circumference of the spline teeth 101b of the hub 101. The flange 102 is the generally same as the flange 2 shown in the first embodiment in FIG. 7 and hence the explanation therefor will be omitted herein. A pair of sub-plates 104 are arranged in contact with opposite surfaces of the flange 102. Each of the sub-plate 104 is the generally same as the sub-plate 4 sixown in the first embodiment in FIG. 5 and hence the explanation therefor will be omitted herein.

A clutch plate 106 and a retaining plate 107 which are the input members are arranged on opposite sides of the flange 102 and are disc-like plates which rotatably engage with the hub 101 from the axially outward side. A lubricant chamber which is filled with lubricant oil such as grease is defined between the clutch plate 106 and the retaining plate 107. Both plates 106 and 107 have central holes that engage with the circumference of the hub 101. Sleeve portions 106a and 107a extending outwardly in the axial direction are formed around the respective central holes and are brought into contact with the outer circumferential surface of the hub 101. O-rings 108 and 109 are arranged in grooves formed in the outer circumference of the hub 101 for sealing a space between the outer circumferential surface of the hub 101 and the sleeve portions 106a and 107a. Also, the outer circumferential portion of the two plates 106 and 107 are fixed to each other by rivets 110. Further, an inner circumferential portion of a cushioning plate 129 is fixed to the outer circumferential portion of the two plates 106 and 107 by the rivets 110.

Annular seal members 132 are interposed between the outer circumferential end portion of the clutch plate 106 and the inner circumferential portion of the cushioning plate 129 and between the outer circumferential portion of the retaining plate 107 and the inner circumferential portion of the cushioning plate 129. Facings 130 and 131 are fixed to the opposite surfaces of the cushioning plate 129. When the facings 130 and 131 are pushed against, for example, a flywheel (not shown) on an engine, a torque is input into the damper disc assembly.

Figure 16:
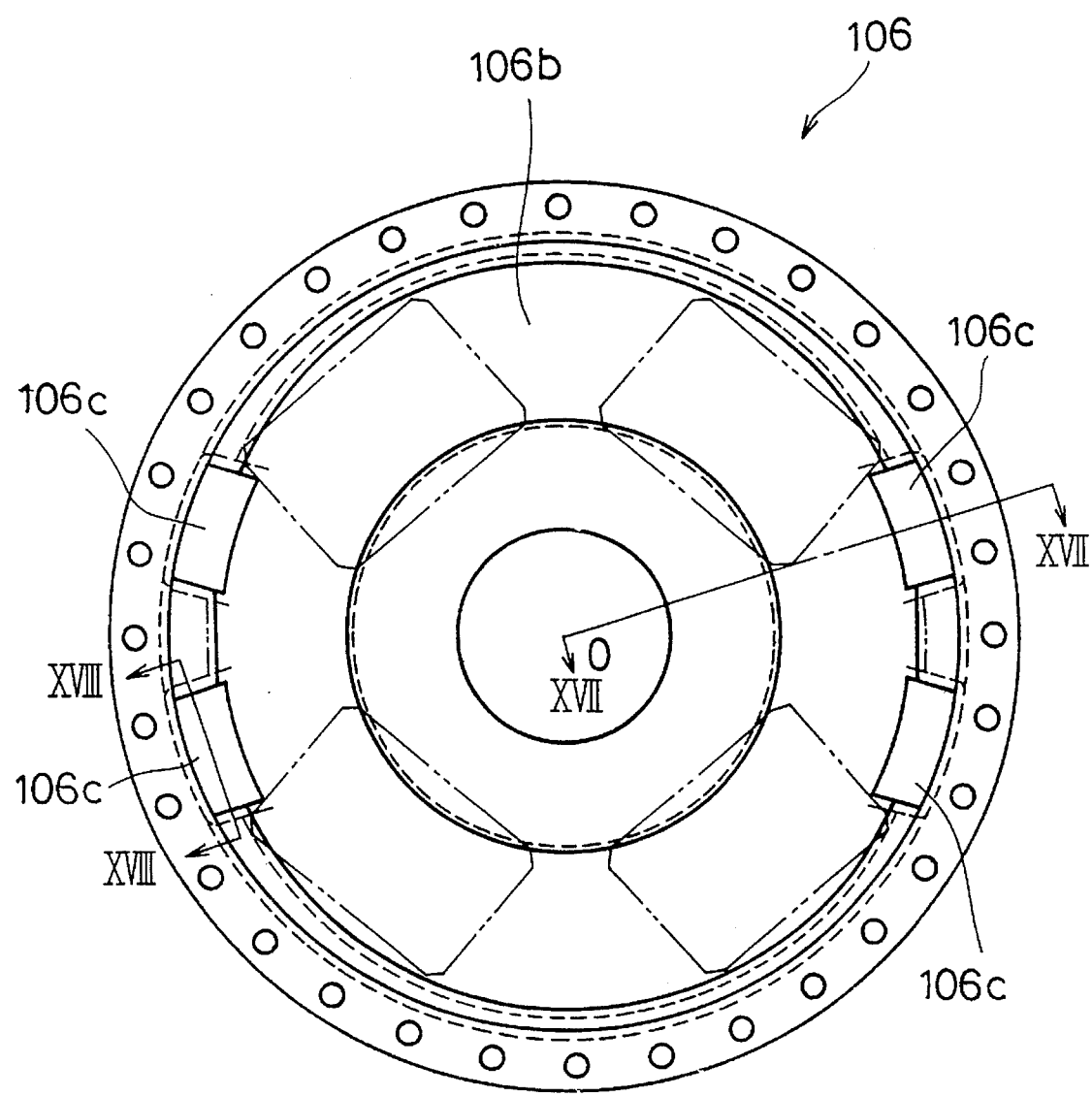
FIG. 16 is a plan view showing a clutch plate shown in FIG. 13.
Figure 17:
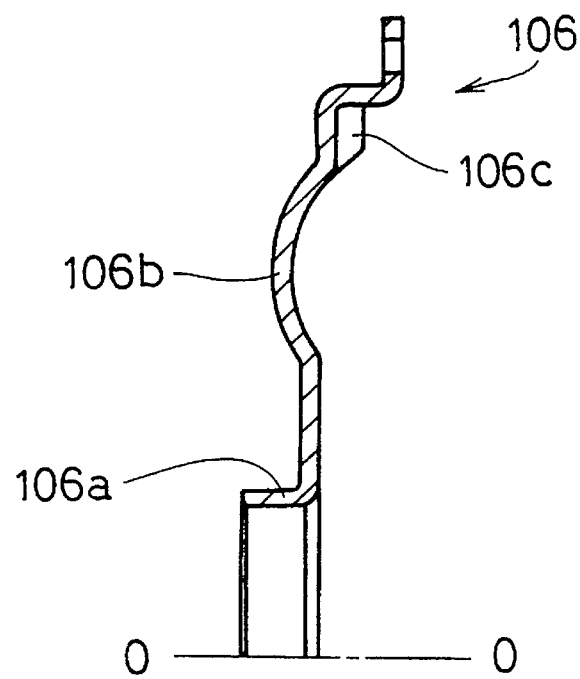
FIG. 17 is a cross-sectional view taken along the line XVII—XVII of FIG. 16.
Figure 18:
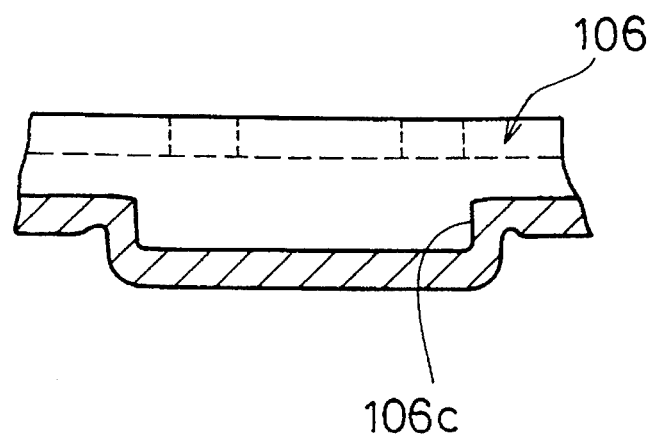
FIG. 18 is a cross-sectional view taken along the line XVIII—XVIII of FIG. 16.

Drawn portions 106b and 107b each extending axially outwardly in annular forms are formed in the radial medium portions of the clutch plate 106 and the retaining plate 107. As shown in FIGS. 16, 17 and 18, a pair of engagement recesses 106c and 107c concave radially outwardly are formed in the outer circumferential sides of the drawn portions 106b and 107b. Two pairs of the engagement recesses 106c and 107c are arranged in diametrically opposite relation.

Figure 19:
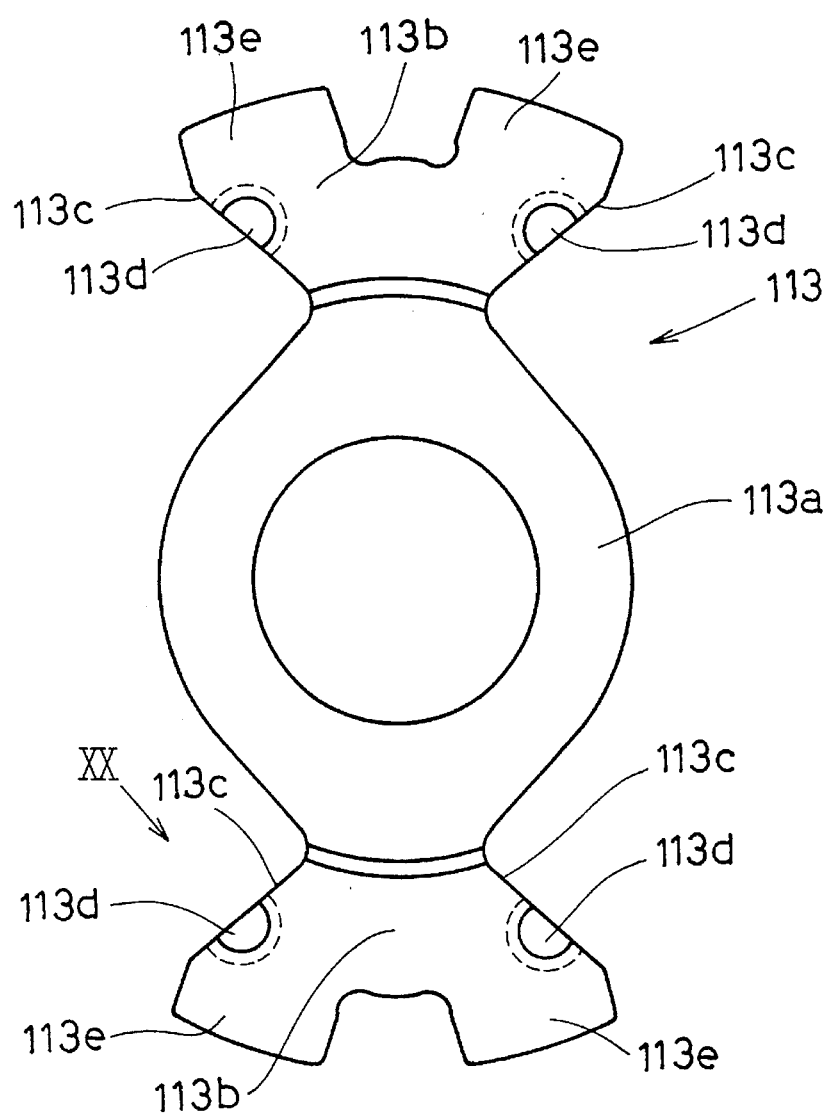
FIG. 19 is a plan view showing an engagement plate shown in FIG. 13.
Figure 20:
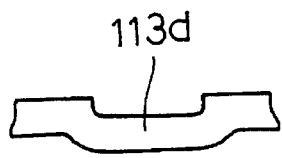
FIG. 20 is a perspective view as viewed in the direction XX of FIG. 19.

Engagement plates 112 and 113 are arranged axially inwardly of the clutch plate 106 and the retaining plate 107, respectively, and are rotatably engaged with the outer circumference of the hub 101. The engagement plate 113 will now be explained with reference to FIG. 19.

The engagement plate 113 is mainly composed of a disc portion 113a and a pair of sector portions 113b each extending in the radially outward direction from the disc portion 113a. Each sector portion 113b is shifted or offset axially inwardly from the disc portion 113a. Both circumferential ends of the respective sector portions 113b serve as contact surfaces 113c. A recess 113d which is shifted or offset axially inwardly is formed on each contact surface 113c side. A pair of engagement portions 113e extending radially outwardly are formed in both circumferential ends of the sector portion 113b. The engagement portions 113e are engaged with an engagement recess 107c of the retaining plate 107. Namely, the engagement plate 113 is constructed so as to rotate together with the retaining plate 107. Incidentally, the engagement plate 112 has like structures and like combinations so as to rotate together with the clutch plate 106.

Two coil springs 115 are arranged within each windows 151 of the flange 102. Namely, four coil springs 115 in total are arranged. As is apparent from FIG. 13, each coil spring 115 is composed of a large spring 115a and a small coil spring 115b disposed within the large coil spring 115a. Circumferential outer end faces of each large coil spring 115a and small coil spring 115b are in contact with end faces 102c of the flange 102. A spring support structure 116 (to be described later) is arranged between the pair of coil springs 115 within each window 151, and the circumferential inner end faces of each coil spring 115 is in contact with the spring support structure 116. More specifically, the contact surfaces 112c and 113c of the sector portions 112b and 113b are in contact with the large coil spring 115a and recesses 112c and 113c are in contact with the small coil spring 115b. Thus, the flange 102 and the clutch plate 106 and retaining plate 107 are elastically coupled in the circumferential direction through coil springs 115 therebetween.

The spring support structure 116 will be explained with reference to FIG. 21. The spring support structure 116 is mainly composed of a pair of float members 118, a pair of support plates 119 and a plurality of rivets 121.

Figure 21:
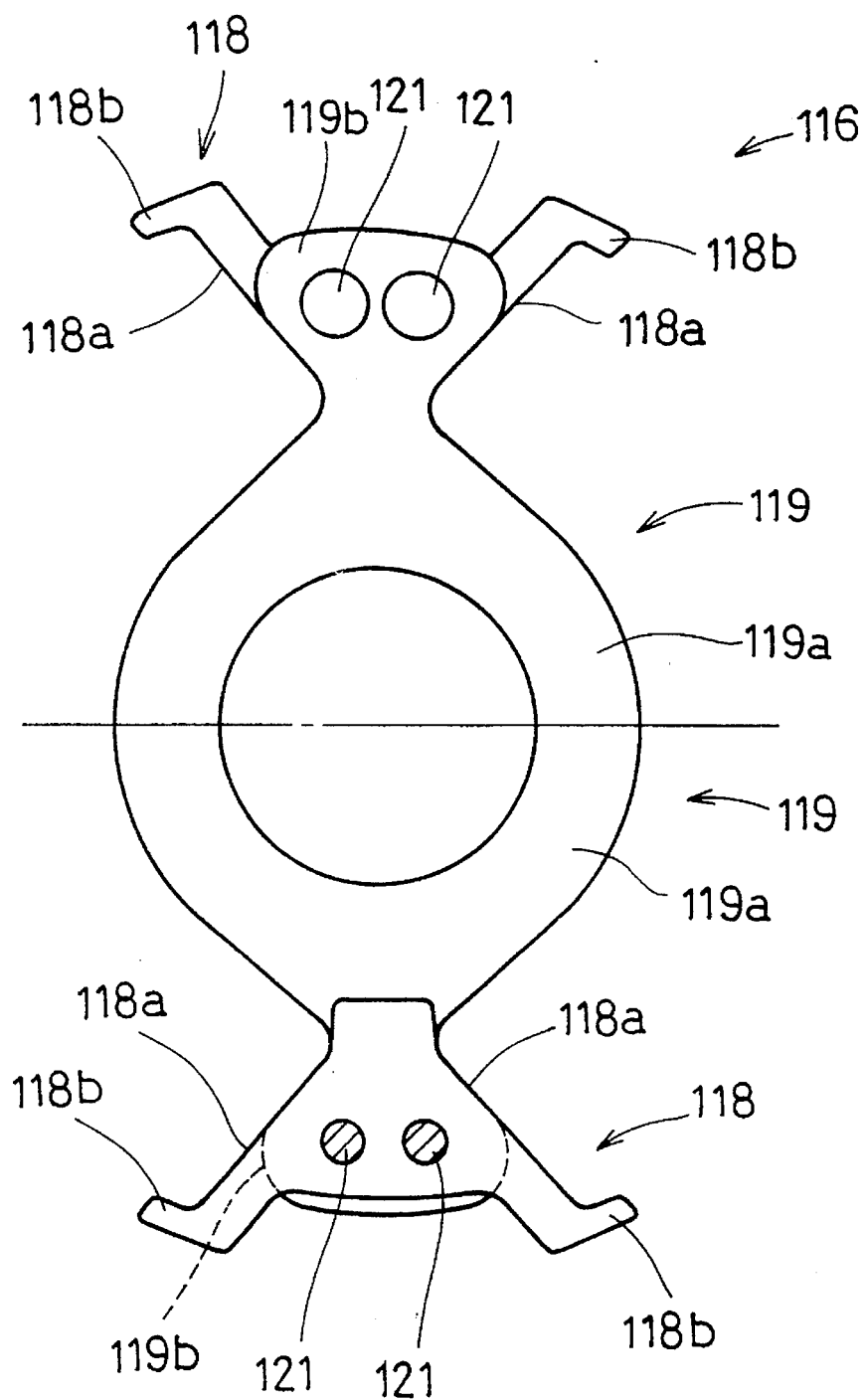
FIG. 21 is a plan view showing a spring support structure shown in FIG. 13.

As is apparent from FIG. 21, each float member 118 is shaped substantially into a triangle. Each float member 118 is sandwiched between two coil springs 115 within each second window 51. The float member 118 has spring retainer portions 118b extending radially outwardly from the triangular portion and in the outer circumferential direction therefrom. The spring retainer portion 118b restricts the radially outward movement of the coil spring 115 together with the spring retainer portion 102e formed in each end face 102c of the flange 102. Each support plate 119 is arranged on the sub-plate 104 on the axially outward side and is provided with a center hole that rotatably engage with the circumference of the hub 101. Each support plate 119 is composed of a disc portion 119a having the center hole and retainer portions 119b extending radially outwardly. Each float member 118 is fixed and sandwiched between the retainer portions 119b of the support plates 119 by two rivets 121. Thus, since each float member 118 is not movable radially outwardly, it is not necessary to provide any window in the flange 102 for restricting the movement of the float member 118.

A friction washer 123 is interposed between the disc portion 112a of the engagement plate 112 and the disc portion 119a of the support plate 119. A friction washer 124 is interposed between the disc portion 113a of the engagement plate 113 and the disc portion 119a of the support plate 119. Lubricant grooves extending in the radial direction are formed in the friction washers 123 and 124.

The operation of the damper disc assembly will now be described.

When the facings 130 an 131 are pressed to the flywheel (not shown) on an engine, the torque of the engine side flywheel is input into the clutch plate 106 and the retaining plate 107. The torque is transmitted to the flange 102 through the engagement plates 112 and 113 and the coil springs 115. The torque is further transmitted to the hub 101 through small springs 103 and the sub-plates 104 and further transmitted to the shaft (not shown) on the output side.

When the displacement vibration is transmitted from the engine side flywheel (not shown) to the damper disc assembly, the clutch plate 106 and the retaining plate 107 which are the input side members repeatedly take rotations in the circumferential direction relative to the hub 101. At this time, the coil springs 115 and the small springs 103 repeatedly take expansions and compressions. Since the coil springs 115 and the small springs 103 are disposed in the lubricant chamber, and therefore, members for supporting the coil springs 115 and the small springs 103 are lubricated so that wear occurring at those members may be considerably suppressed.

As described above, the engagement plates 112 and 113 are provided as members for transmitting the torque to the coil springs. Accordingly, it is possible to dispense with the formation of deep drawn portions for supporting both ends of the coil springs 115 and the clutch plate 106 and retaining plate 107. In particular, in such a damper disc assembly in which the small springs 115b are arranged within the large coil springs 115a, it is necessary to draw the deep drawn portion so as to reach the small coil springs 115b in the structure where the deep drawn portion is formed. In such a case, the mechanical strength of the clutch plate 106 and retaining plate 107 is reduced, and damage or break-down would be likely to occur.

Figure 22:
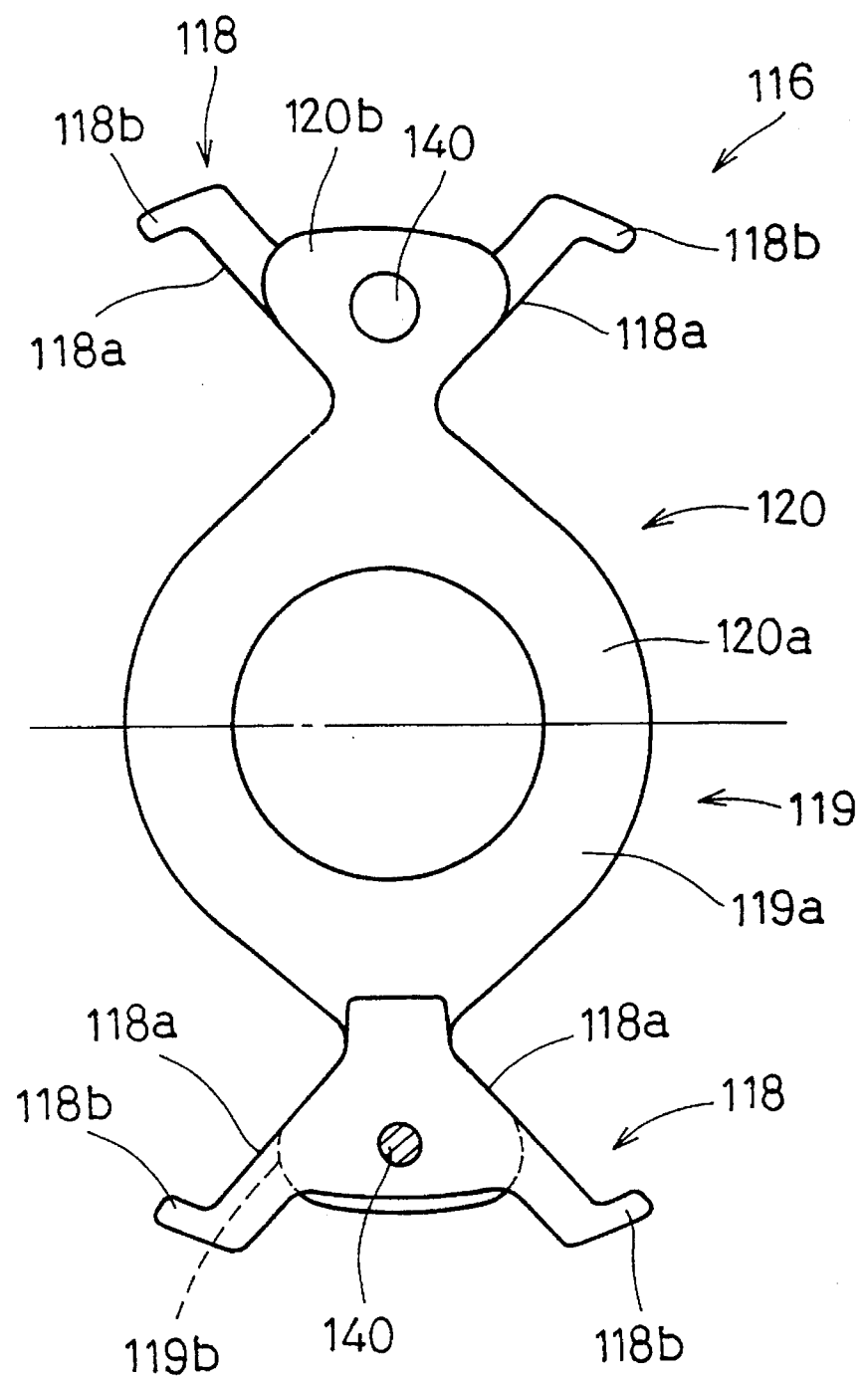
FIG. 22 is a view of a modification corresponding to FIG. 21.

In the second embodiment, the float members 118 are fixed to the retainer portions 119b of the support plates 119. It is however possible to rotatably couple the float member 118 to each retainer portion 119b of the support plate 119 by a pin 140 as shown in FIG. 22. In this case, in response to a difference of flexion between the outer circumferential end and the inner circumferential end of each coil spring 115 when the coil spring 115 is compressed, the float member 118 is rotated so that the inner circumferential end is expanded in the circumferential direction and the outer circumferential end is compressed in the circumferential direction. As a result, the coil spring 115 is compressed substantially in parallel so that the amount of flexion may be constant between the outer and inner circumferential ends. For this reason, the bending stress applied to the coil spring 115 is suppressed and the durability is enhanced.

Various details of the present invention may be changed without departing From its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A vibration damper assembly comprising:

a hub, formed with a plurality of splines on an outer radial portion thereof;

a flange member having a central opening formed with spline engagable portions through which said hub extends, said spline engagable portions engagable with said splines allowing limited rotary displacement of said flange about said hub, said flange formed with at least one radially extending portion having first and second spring member receiving portions formed thereon;

a sub-plate member coupled to said hub for rotation therewith;

a first spring member disposed within said first spring member receiving portion and engagable with a portion of said sub-plate member;

a support member rotatably disposed about said hub;

a second spring member disposed within said second spring member receiving portion and engaging a portion of said support member, said second spring member having a higher rigidity than that of said first spring member;

at least one plate member rotatably disposed about said hub for limited rotary displacement therewith and in engagement with said second spring member;

a clutch friction surface portion coupled to said plate member for selective coupling to the flywheel of a torque providing rotary device.

2. A vibration damper assembly as set forth in claim 1 further comprising friction disk disposed between said sub-plate member and said support member for producing friction therebetween in response to relative rotation between said sub-plate member and said support member.

3. A vibration damper assembly as set forth in claim 2 further comprising a conical washer disposed between said support member and said plate member for urging said friction disk into engagement with said support member and said sub-plate member.

4. A vibration damper assembly as set forth in claim 1 wherein said plate member is formed with a window for receiving said second spring member, a surface of said plate exposed to said window being shaped to engage one end of said second spring member.

5. A vibration damper assembly as set forth in claim 1 wherein said plate member is formed with protrusion shaped to engage one end of said second spring member.

6. A vibration damper assembly as set forth in claim 1 wherein angular displacement of said hub and said flange member is limited to a range of about 10×.

7. A vibration damper assembly as set forth in claim 1 wherein the total relative displacement between said plate and said hub is greater than 16×.

8. A vibration damper assembly as set forth in claim 1 further comprising a clutch plate interposed between said plate member and said clutch friction surface portion, said plate member engaging said clutch plate and said clutch plate connected to said clutch friction surface portion for transmitting torque between said clutch friction surface portion and said plate member.

9. A vibration damper assembly as set forth in claim 1 further comprising a plurality of rivets extending through a portion of said plate member and said clutch friction surface portion rigidly connecting said plate member to said clutch friction surface portion.

10. A vibration damper assembly comprising:

a hub, formed with a plurality of splines on an outer radial portion thereof;

a flange member having a central opening formed with spline engagable portions through which said hub extends, said spline engagable portions engagable with said splines allowing limited rotary displacement of said flange about said hub, said flange formed with two radially extending portions each portion having first and second spring member receiving portions formed thereon;

a pair of sub-plate members, each coupled to said hub for rotation therewith on opposite sides of said flange;

a pair of first spring members each disposed within one of said first spring member receiving portions and each of said first spring members engagable with a portion of said sub-plate members;

a pair of support members rotatably disposed about said hub;

two pairs of second spring members disposed within said second spring member receiving portions, each pair engaging a portion of said support members, said second spring members having a higher rigidity than that of said first spring members;

a pair of plate members rotatably disposed about said hub for limited rotary displacement therewith on opposite sides of said flange member and in engagement with said second spring members;

a clutch friction surface portion coupled to said plate members for selective coupling to a flywheel of a torque providing rotary device.

11. A vibration damper assembly as set forth in claim 10 further comprising a pair of friction disks disposed between said sub-plate members and said support members for producing friction therebetween in response to relative rotation between said sub-plate members and said support members.

12. A vibration damper assembly as set forth in claim 11 further comprising a conical washer disposed between one of said support members and an adjacent one of said plate members for urging said friction disks into engagement with said support members and said sub-plate members.

13. A vibration damper assembly as set forth in claim 10 wherein each of said plate members is formed with a plurality windows, each window for receiving one of said second spring members, a surface of each of said windows being shaped to engage one end of a corresponding one of said second spring members.

14. A vibration damper assembly as set forth in claim 10 wherein said each of plate members is formed with a plurality of protrusions, each protrusion shaped to engage at least one end of one of said second spring members.

15. A vibration damper assembly as set forth in claim 10 wherein angular displacement of said hub and said flange members is generally within a range of about 10×.

16. A vibration damper assembly as set forth in claim 10 wherein the total relative displacement between said plate and said hub is greater than 16×.

17. A vibration damper assembly as set forth in claim 10 wherein said flange radially extending portions are formed symmetrically about said central opening and said first spring member receiving portions are formed off center relative the symmetry of said radially extending portions.

18. A vibration damper assembly as set forth in claim 10 further comprising a clutch plate and a retaining plate disposed on opposing axial ends of said hub, said hub, said clutch plate and said retaining plate defining a fluid filed chamber therebetween, said flange, said pair of sub-plate members, said first spring members, said support members, said second spring members and said plate members disposed within said fluid filled chamber.

19. A vibration damper assembly as set forth in claim 18 wherein said clutch plate engages a first of said pair of plate members, and said retaining plate engages a second of said pair of plate members, and said plate member and said clutch plate connected to said clutch friction surface portion for transmitting torque between said clutch friction surface portion and said plate members.

20. A damper disc assembly comprising:

a hub;

a flange coupled to said hub for limited rotary displacement therewith, said flange having a pair of opposing radially extending sector portions, each sector portion formed with a window therein, and said sector portions defining a pair of a circumferentially extending spring engagement portions therebetween;

at least two first spring members, one of said first spring members disposed in each one of said windows;

a sub-plate member disposed adjacent to said flange and about said hub, said sub-plate configured to rotate with said hub, said sub-plate member having sub-plate windows formed therein, said first spring members extending into said sub-plate windows, said first spring members coupling said sub-plate member and said flange;

a spring support member disposed adjacent to said sub-plate member, said spring support member having two radially extending portions, said radially extending portions circumferentially spaced apart from said sector portions; and at least a pair of second spring members, one of said second spring members disposed between each one of said sector portions and said radially extending portions, said second spring members coupling said flange and said sub-plates;

an engagement plate disposed adjacent to said spring support member, said engagement plate contacting said second spring members; and a clutch friction surface coupled to said engagement plate.

\* \* \* \* \*